June 25, 1963   K. F. OLDENBURG ETAL   3,095,143
CALCULATING MACHINE
Filed Sept. 25, 1961   3 Sheets-Sheet 2
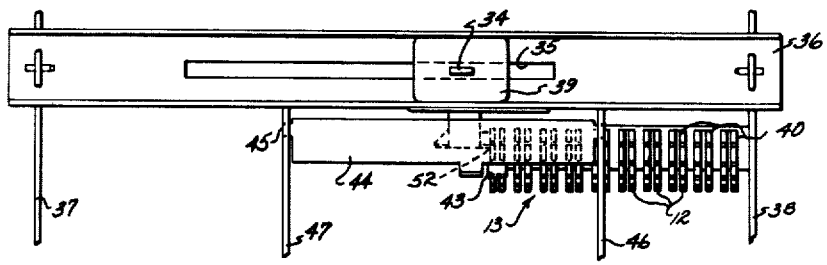
FIG. 2
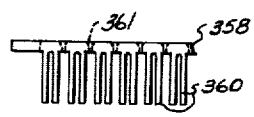
FIG. 6
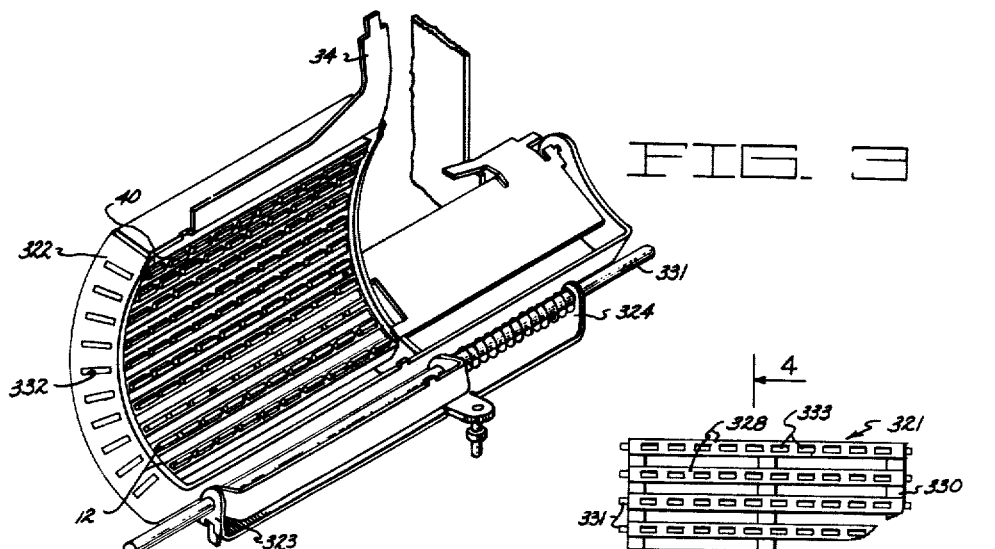
FIG. 3
FIG. 4
FIG. 5
FIG. 7
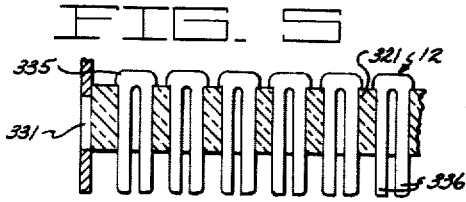
INVENTORS.
KENNETH F. OLDENBURG
BRYAN F. KUHNE
DOMINICK FAZIO
BY
ATTORNEY

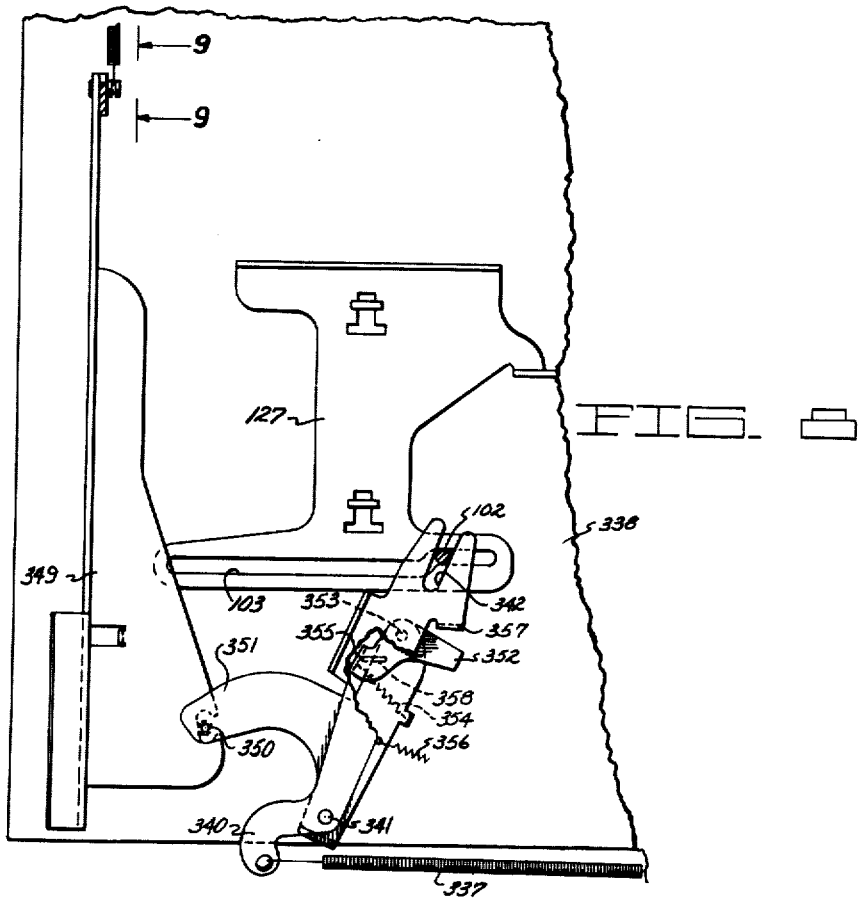
FIG. 8
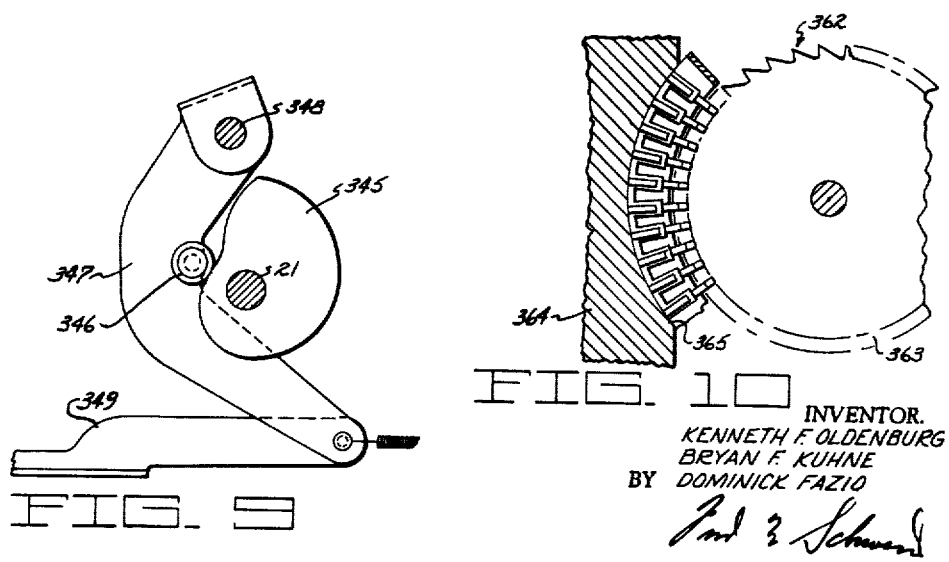
FIG. 9
FIG. 10
INVENTOR.
KENNETH F. OLDENBURG
BRYAN F. KUHNE
BY DOMINICK FAZIO
ATTORNEY

United States Patent Office 3,095,143
Patented June 25, 1963

3,095,143
CALCULATING MACHINE
Kenneth F. Oldenburg, Monterey Park, Bryan F. Kuhne, Monrovia, and Dominick Fazio, San Gabriel, Calif., assignors, by mesne assignments, to Addmaster Corporation, San Gabriel, Calif., a corporation of California
Filed Sept. 25, 1961, Ser. No. 140,549
6 Claims. (Cl. 235—60)

This invention relates to calculating and adding machines of the ten-key type and has particular reference to a stop pin carriage carrying stop pins for differentially controlling the extent of advancement of differential actuators for such machines. The invention has further reference to a method of making a pin carriage.

Heretofore, pin carriages of the above type have generally been constructed of metal stampings or the like embodying a considerable number of parts including two spaced plates having a number of aligned rows of openings in which the stop pins are slideably mounted. Additional detenting means, such as detent springs, are provided to hold the pins in either retracted positions or projected positions wherein they are effective to arrest advancement of aligned ones of the actuators.

Although such prior pin carriages are generally satisfactory, they are relatively expensive to manufacture because of the number of parts involved and the time required to assemble the pins and other parts.

Therefore, it becomes a principal object of the present invention to provide a pin carriage having a minimum number of parts.

Another object of the present invention is to provide a pin carriage which is easy, quick and economical to assemble.

Another object of the invention is to provide a pin carriage which has a minimum of mass and therefore reduces any tendency to lag in operation due to inertia effects.

Another object of the invention is to provide a pin carriage in which the stop pins may be readily removed or replaced without disassembling the pin carriage.

A still further object of the invention is to facilitate assembly of pins in a pin carriage.

The manner in which the above and other objects of the invention are accomplished will be readily understood on reference to the following specification when read in conjunction with the accompanying drawings, wherein:

FIG. 2 is a sectional plan view illustrating part of the pin carriage and is taken substantially along the line 2—2 of FIG. 1.

FIG. 3 is a perspective view of the pin carriage.

FIG. 4 is an enlarged sectional view, partly broken away, of the pin carriage when in its flat condition and with pins assembled therein, and is taken along the line 4—4 of FIG. 7.

FIG. 5 is another enlarged sectional view of the pin carriage and is taken along the line 5—5 of FIG. 7.

FIG. 6 is a side view of a stop pin strip with stop pin formations thereon.

FIG. 7 is a plan view of the pin carriage body when in its initial flat condition.

FIG. 8 is a sectional plan view taken substantially along the line 8—8 of FIG. 1, illustrating part of the pin carriage return mechanism.

FIG. 9 is a sectional side view of the pin carriage return cam and cam follower and is taken along the line 9—9 of FIG. 8.

FIG. 10 is a side view of a portion of the pin carriage and a shearing device for shearing the stop pin formations from the stop pin strips.

Figure 1:
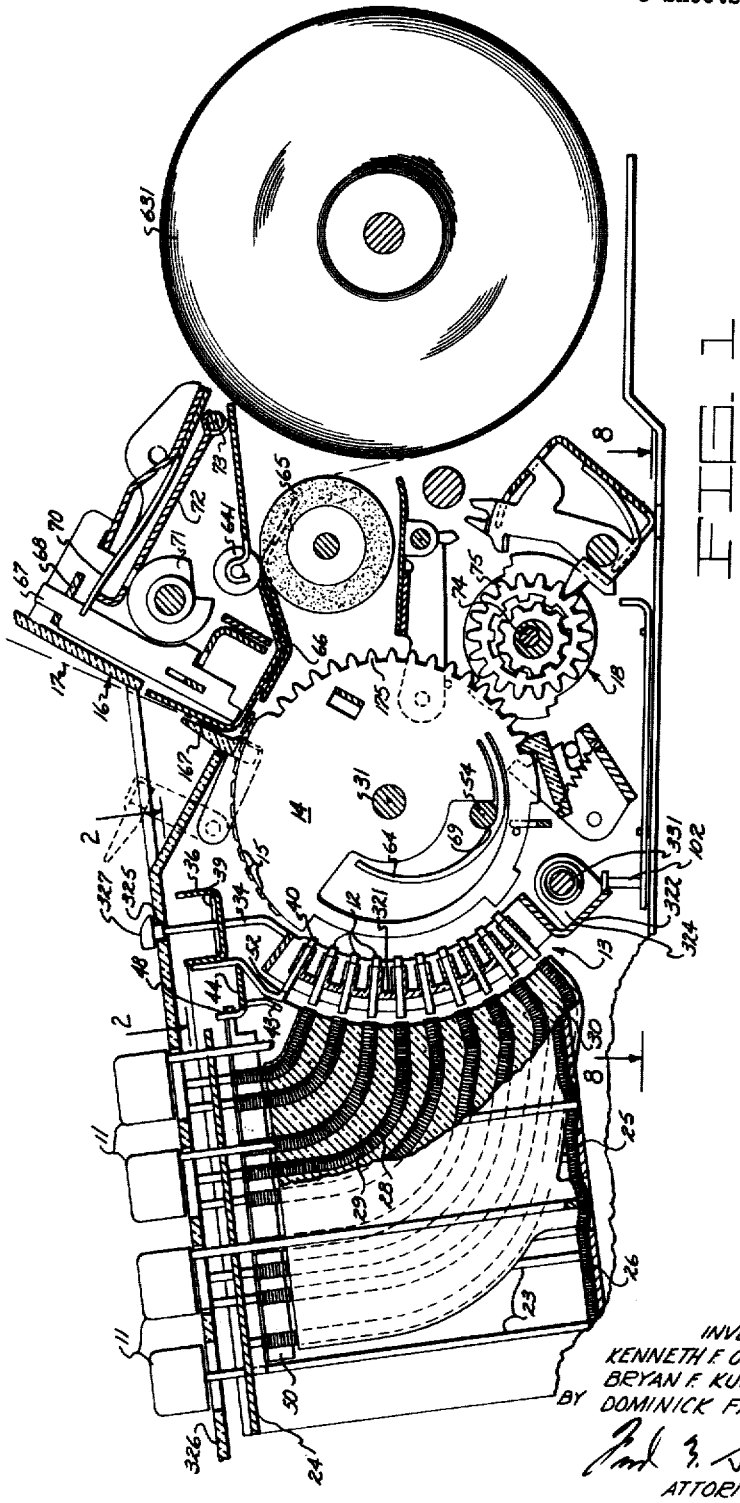
FIG. 1 is a longitudinal sectional view through an adding machine embodying a preferred form of the present invention.

Referring to the drawings, the machine is of the ten-key type wherein the digits of a value are entered sequentially through ten depressible amount keys 11, ranging in value from 0 to 9.

Depression of an amount key sets an appropriate stop pin 12 in a pin carriage, generally indicated at 13, which shifts laterally of the machine into cooperative relation with the combined differential actuators and printing sectors 14.

The amount keys 11 are mounted on key stems 23 slideable vertically in slots provided in upper and lower key frame plates 24 and 25, respectively, the latter forming part of the framework of the machine. Tension springs 26 attached at their ends to the lower plate 25 extend under the key stems to normally hold the amount keys in raised condition.

Each key stem has a portion attached to the upper end of a flexible cable 28. The various cables are vertically aligned with each other and are slideably mounted for endwise movement in grooves 29 formed in a guideblock 30 which is suitably attached to the lower frame plate 25. The various cables terminate in an arcuate pattern concentric with a shaft 31 which is suitably supported by the framework of the machine. The shaft 31 rotatably supports the various sectors 14 independently of each other.

In accordance with the present invention, the pin carriage 13 is formed of a molded plastic body 321 (FIGS. 3, 4, 5 and 7) supported in an arcuate shape concentric with the shaft 31 by a metal frame 322 which surrounds the same. The frame 322 has bearing tabs 323 and 324 (FIG. 3) extending therefrom and slideably mounted on a stationary rod 331 which is suitably supported by the frame plates 37 and 38 for guiding the lower portion of the pin carriage across the machine. Also, the frame 322 has an upper extension 34 which extends through a slot 35 (FIG. 2) formed in a channel member 36 which is secured at its ends to the frame plates 37 and 38. A slide 39 attached to the extension 34 is guided by the channel member 36 to likewise guide the upper end of the pin carriage. The extension 34 also extends through a slot 325 in a machine cover 326 and terminates in a knob 327, permitting the pin carriage to be returned manually to its home position shown in FIG. 2, if so desired.

As shown in FIGS. 4, 5 and 7, the pin carriage body 321 is formed of a plurality of parallel spaced bars 328 connected together by webs 330 which are considerably smaller in cross section than the bars 328. The bars are provided with projections 331 extending from opposite ends thereof.

Initially, the body 321 is formed as a flat piece, as indicated in FIGS. 4 and 7, but it is subsequently mounted in the curved frame 322 by bending of the same into an arcuate form and fitting the projections 331 into mating openings 332 in the sides of the frame. Since the webs 330 are of much smaller cross section than that of the bars 328, the latter will readily yield in bending the body into its arcuate shape without deforming the bars.

The pin carriage body 321 carries a plurality of columns of stop pins 12 extending radially of the shaft 31, and for this purpose, a series of spaced rectangular openings 333 are formed in each of the bars 328.

The pins 12, which are preferably of plastic, each has a head 335 (FIG. 5) and a body bifurcated to form two spring legs 336 which yieldably press outwardly against the adjacent edges of a respective opening in the body 321, thereby frictionally maintaining the pins in different positions to which they may be set within the openings.

It will be noted on reference to FIG. 1 that when the pin carriage is assembled in the machine, the various stop pins 12 are located in horizontal rows aligned with the lower ends of the flexible cables 28. Thus, upon depression of a selected amount key, a respective cable will be moved endwise to likewise move an aligned stop pin 12 from its normally ineffective position shown to a position wherein it forms an abutment in the path of a shoulder 41 formed on an aligned sector 14.

An additional row of escapement pins 40, similar to the pins 12, is located above the latter pins. Such pins cooperate with a stop shoulder 52 (FIG. 2) extending from the channel member to normally hold the pin carriage in its home or other denominational position. The pins 40 are aligned with the various vertical columns of pins 12 and are engageable by a finger 43 (FIGS. 1 and 2) of a bail 44 which is pivotally supported at 45 in frame plates 46 and 47 forming part of the machine framework. The bail 44 is pivotally connected at 48 to a second bail 50 which is pivotally supported in a manner not shown for movement about an axis extending longitudinally of the machine. The bail 50 is actuated by each of the amount keys 11 upon depression thereof to likewise effect depression of whichever escapement pin 40 is aligned with the finger 43.

The pin carriage 13 is spring urged to the left in FIG. 2 by a tension spring 337 (FIG. 8) connected between a part of a bottom frame plate 338 and a lever 340 fulcrummed at 341 on the plate 338. The lever is provided with a slot 342 which embraces a pin 102 depending from the pin carriage frame 322. Thus, upon depression of any amount key to set an appropriate stop pin 12, the bails 50 and 44 are actuated to depress an aligned escapement pin 40, permitting the pin carriage to escape one column to the left where the next escapement pin 40 will arrest against the stop shoulder 52.

The sectors 14 are yieldably driven in a clockwise direction by a bail rod 54 which is swung clockwise around the axis of shaft 31 during the first half of a machine cycle. As disclosed and claimed in the copending application of B. F. Kuhne, Serial No. 140,544, filed September 25, 1961, for "Calculating Machine," the bail rod normally engages a detent shoulder 69 on a yieldable tail 64 formed integrally with each sector. When the sectors are arrested by set ones of the pins 12 or by different accumulator elements during totaling and subtotaling operations, the tails 64 will be deflected, permitting the bail rod 54 to continue to the end of its excursion. After completion of the printing phase, as will be described presently, the bail rod 54 is returned counterclockwise and in doing so, it will likewise return the various sectors to their illustrated home positions.

The sectors 14 cooperate with a printing mechanism, generally indicated at 16, to print amounts registered by the sectors onto a paper strip 17. For this purpose, each sector carries a series of type characters 15 on its periphery, ranging in value from 0 to 9, the character 0 being located at the clockwisemost location relative to the rest of the series.

The paper strip 17 is fed from a supply roll 631 between feed rolls 65 and 641 and through a guideway 66, past a printing station located between the sectors 14 and respective hammers 67. From such station, the strip is passed upwardly behind the transparent tear-off bar 167.

The hammers are suitably guided in a frame 68 for endwise movement radially of the sectors 14, toward and away from contact with the paper strip 17. Leaf spring elements 70 urge the hammers downwardly but are normally restrained by a rotatable cam element 71 which cooperates with a follower bail 72 pivoted at 73 to normally hold the spring elements and hammers in upper positions.

The cam 71 is suitably entrained through gearing (not shown) with a cylically operable main drive shaft 21 so that during the printing phase which occurs after the sectors 14 have been differentially advanced, the cam 71 permits the springs 70 to impel the hammers 67 downwardly, thus causing an imprint of selected type characters 15 onto the strip 17 through a suitable printing ribbon (not shown).

The above printer and associated mechanism is disclosed in detail and claimed in the copending application of H. L. Clary et al., Serial No. 140,336, filed August 25, 1961, for "Calculating Machine."

The sectors 14 are also effective to differentially actuate an accumulator, generally indicated at 18. The latter is of the crawl carry type and is disclosed in detail and claimed in the copending application of R. E. Busch, Serial No. 130,078, filed August 8, 1961, for "Calculating Machine." The accumulator, in general, comprises denominationally arranged gears 75 and other elements rotatably mounted on an accumulator shaft 74. Normally, the accumulator is held in a lower position, as shown in FIG. 1, wherein the accumulator gears 75 are located out of mesh with gear sections 175 formed on respective ones of the sectors 14.

During a digitizing phase of a machine cycle, the accumulator gears 75 are maintained in mesh with the sectors 14 so as to transfer digital amounts from the sectors 14 into the accumulator. Likewise, during totaling and subtotaling operations, the accumulator is maintained in mesh with the sectors for the purpose of transferring amounts from the accumulator to the sectors so that such amounts may be printed.

During the latter stages of a machine cycle, the pin carriage is returned to its home position depicted in FIG. 2 by a cam 345 (FIG. 9) carried by drive shaft 21. The cam 345 engages a roller 346 on a cam follower 347 pivotally supported at 348 and connected to one end of a link 349 (see also FIG. 8). The latter is coupled through a pin and slot connection 350 to a bell crank 351 which is fulcrummed at 341 independently of the lever 340. A bypass pawl 352 is pivoted at 353 on the bell crank 351 and is urged counterclockwise relative to the bell crank by a tension spring 354 toward a position wherein an ear 355 may engage the side of the bell crank 351.

The cam 345 is effective to cause link 349 to first swing the bell crank 351 counterclockwise of its position illustrated in FIG. 8 against the action of a tension spring 356 extending between the bell crank and a part of the plate 338. During this movement, the ear 355 of pawl 352 will recede from engagement with a stationary projection 358 upstanding from the plate 338, permitting the spring 354 to rotate the pawl slightly counter-clockwise so that its right hand end will locate to the left of an ear 357 on the lever 340 and in position to engage the same when the bell crank 351 is returned clockwise. During return of the bell crank by spring 356, the pawl 352 will engage the ear 357 to drive the lever 340 and the pin carriage rightward toward its home position wherein the pin 102 will come to rest in the position shown in FIG. 8. As the pin carriage moves into such home position, the ear 355 of the bypass pawl will strike stationary projection 358, rocking the pawl clockwise relative to the bell crank so that it will pass below the ear 357. The pin carriage is thus freed of the bypass pawl so that it may again be indexed to the left by depression of the amount keys.

The pin 102 is also embraced by a slot 103 in a blocking plate 127 whereby the plate is shifted fore and aft of the machine as the pin carriage moves out of and into its home position. The plate 127 forms no part of the present invention but its connection with the rest of the machine is disclosed in the aforementioned Busch application, Serial No. 130,078.

During return of the pin carriage to its home position, any depressed ones of the pins 12 move over a stationary cam (not shown) which returns them to their normal ineffective positions of FIG. 1.

Further, in accordance with the present invention, the various stop pins 12 are preferably initially formed into strips 358 (FIG. 6) wherein stop pin formations 360 are spaced apart distances equal to the spacings of the holes 333 in the plastic pin carriage body 321. Accordingly, the strips 358 may be easily and quickly assembled in the corresponding holes of respective bars 328, thereby considerably reducing the time required to assemble the pins. Subsequently, and preferably after the body 321 is assembled in the frame 322, the strips are severed along the dotted lines 361 (FIG. 6) to form the individual stop pins by a milling device, generally indicated at 362 (FIG. 10). The latter comprises a plurality of axially spaced milling cutters 363 shaped to conform with the dotted lines 361. The pin carriage is suitably mounted in front of a support block 364 having a concave face 365 engaging the outer ends of the stop pin formations. The pin carriage and block are then moved as a unit toward the cutters 363 during rotation of the latter whereby to sever all of the pins from the strips 358 at one time.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a calculating machine having denominationally arranged actuators differentially and independently advanceable about a common axis, each of said actuators having an abutment thereon, and means for yieldably advancing said actuators; a stop pin carriage for differentially arresting said actuators in different advanced positions, said carriage comprising an integral arcuate body having a plurality of spaced parallel bars extending parallel bars extending parallel to said axis, spaced openings in said bars, and webs connecting said bars, said webs being of smaller cross section than the cross sections of said bars, and stop pins movable lengthwise in said openings, said stop pins being movable into the paths of said abutments.

2. In a calculating machine having denominationally arranged actuators differentially and independently advanceable about a common axis, each of said actuators having an abutment thereon, and means for yieldably advancing said actuators; a stop pin carriage for differentially arresting said actuators in different advanced positions, said carriage comprising an integral arcuate body having a plurality of spaced parallel bars extending parallel to said axis, spaced openings in said bars, and webs connecting said bars, said webs being of smaller cross section than said cross sections of said bars, and stop pins slideable lengthwise in said openings, said stop pins being bifurcated, and said bifurcations yieldably pressing outwardly relative to each other whereby to frictionally engage the sides of said openings.

3. In a calculating machine having denominationally arranged actuators differentially and independently advanceable about a common axis, each of said actuators having an abutment thereon, and means for yieldably advancing said actuators; a stop carriage for differentially arresting said actuators in different advanced positions, said carriage comprising an integral arcuate body of yieldable material having a plurality of spaced parallel bars extending parallel to said axis, spaced openings in said bars, and webs connecting said bars, said webs being of smaller cross section than the cross sections of said bars, a frame, said frame having means for supporting said body substantially concentrically about said axis, and stop means movable lengthwise in said openings, said stop means being movable into the paths of said abutments.

4. In a calculating machine having denominationally arranged actuators differentially and independently advanceable about a common axis, each of said actuators having an abutment thereon, and means for yieldably advancing said actuators; a stop pin carriage for differentially arresting said actuators in different advanced positions, said carriage comprising an integral arcuate body of flexible material having a plurality of spaced parallel bars extending parallel to said axis, spaced openings in said bars, and webs connecting said bars, said webs being of smaller cross section than the cross section of said bars, a frame having end pieces, said end pieces having openings therein extending concentrically of said first mentioned axis for receiving said bars whereby to support said body substantially concentrically of said first mentioned axis, and stop pins movable lengthwise in said openings, said stop pins being movable into the paths of said abutments.

5. In a calculating machine having denominationally arranged actuators differentially and independently advanceable relative to each other, each of said actuators having an abutment thereon, and means for advancing said actuators; a stop pin carriage for differentially arresting said actuators in different advanced positions, said carriage having a plurality of openings therein, and elongate stop pins movable lengthwise in said openings into and out of the paths of said abutments, the sides of said openings each being longer in the direction of movement of said stop pin carriage than the width thereof, said stop pins each having a pair of legs yieldably urged from each other whereby to frictionally engage the sides of a respective said opening, said sides of said openings and the sides of said legs adjacent thereto forming continuous rectilinear and parallel sliding surfaces whereby said sides of said legs frictionally engage said sides of said openings throughout said lengths of said openings.

6. In a calculating machine having denominationally arranged actuators differentially and independently advanceable relative to each other, each of said actuators having an abutment thereon, and means for advancing said actuators; a stop pin carriage for differentially arresting said actuators in different advanced positions, said carriage having a plurality of openings therein, and elongate stop pins movable lengthwise in said openings from positions in the paths of said abutments to positions out of the paths of said abutments, the sides of said openings each being longer in the direction of movement of the respective said stop pins than the width thereof, said stop pins comprising pairs of spring legs extending along the lengths of said pins and located in side-by-side relation, said sides of said openings and the sides of said legs adjacent thereto forming continuous rectilinear and parallel sliding surfaces whereby said legs frictionally engage said sides of said openings along said lengths of said openings.

References Cited in the file of this patent
UNITED STATES PATENTS

| | | |
|---|---|---|
| 2,088,397 | Bilde | July 27, 1937 |
| 2,133,916 | Churchill | Oct. 18, 1938 |
| 2,832,130 | Harvey | Apr. 29, 1958 |
| 2,850,231 | Uhlig | Sept. 2, 1958 |
| 2,940,664 | Hornaver | June 14, 1960 |
| 2,988,274 | Carlsen | June 13, 1961 |

UNITED STATES PATENT OFFICE
CERTIFICATE OF CORRECTION

Patent No. 3,095,143 June 25, 1963

Kenneth F. Oldenburg et al.

It is hereby certified that error appears in the above numbered patent requiring correction and that the said Letters Patent should read as corrected below.

Column 5, line 38, strike out "bars extending parallel"; column 6, line 53, for "pins" read -- pin --.

Signed and sealed this 31st day of December 1963.

(SEAL)
Attest:
ERNEST W. SWIDER

Attesting Officer

EDWIN L. REYNOLDS

Acting Commissioner of Patents